United States Patent
Nguyen et al.

(10) Patent No.: US 6,920,572 B2
(45) Date of Patent: Jul. 19, 2005

(54) UNANIMOUS VOTING FOR DISABLING OF SHARED COMPONENT CLOCKING IN A MULTICORE DSP DEVICE

(75) Inventors: Tai H. Nguyen, Houston, TX (US); Harland Glenn Hopkins, Missouri City, TX (US); Duy Q. Nguyen, Austin, TX (US); Kevin A. McGonagle, Sugarland, TX (US); Victor A. Liu, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 683 days.

(21) Appl. No.: 10/008,699

(22) Filed: Nov. 8, 2001

(65) Prior Publication Data

US 2002/0059486 A1 May 16, 2002

Related U.S. Application Data

(60) Provisional application No. 60/248,905, filed on Nov. 15, 2000.

(51) Int. Cl.⁷ ................................................ G06F 1/04
(52) U.S. Cl. ..................... 713/322; 713/324; 713/600
(58) Field of Search ............................. 713/322, 324, 713/600

(56) References Cited

U.S. PATENT DOCUMENTS

| | | | | |
|---|---|---|---|---|
| 5,339,429 A | * | 8/1994 | Tanaka et al. ............... | 712/205 |
| 5,365,183 A | * | 11/1994 | Mitsuhira ..................... | 327/144 |
| 5,537,582 A | * | 7/1996 | Draeger ........................ | 713/401 |
| 5,557,783 A | * | 9/1996 | Oktay et al. ................. | 713/401 |
| 5,677,849 A | | 10/1997 | Smith | |
| 5,710,881 A | | 1/1998 | Gupta et al. | |
| 6,189,076 B1 | * | 2/2001 | Fadavi-Ardekani et al. | 711/147 |
| 6,311,263 B1 | * | 10/2001 | Barlow et al. ............... | 712/36 |
| 6,330,644 B1 | * | 12/2001 | Yamashita et al. .......... | 711/147 |
| 6,340,905 B1 | * | 1/2002 | Schultz ........................ | 327/161 |
| 6,487,647 B1 | * | 11/2002 | Samson ....................... | 711/167 |
| 6,536,024 B1 | * | 3/2003 | Hathaway ....................... | 716/6 |
| 6,597,226 B1 | * | 7/2003 | Eade et al. .................. | 327/292 |
| 6,625,559 B1 | * | 9/2003 | Helder ......................... | 702/117 |
| 6,711,691 B1 | * | 3/2004 | Howard et al. .............. | 713/300 |

FOREIGN PATENT DOCUMENTS

EP 0 633 518 A 1/1995

* cited by examiner

Primary Examiner—Lynne H. Browne
Assistant Examiner—Tse Chen
(74) Attorney, Agent, or Firm—Robert D. Marshall, Jr.; W. James Brady, III; Frederick J. Telecky, Jr.

(57) ABSTRACT

A digital signal processing chip having a multiple processor cores with corresponding processor subsystems, a shared component, and a clock tree, is disclosed herein. A clock tree distributes clock signals to the processor cores and the shared component. The clock tree can be configured to disable one or more of the processor cores and the shared component by blocking the corresponding clock signal. This may advantageously conserve power. However, the clock tree is configured to preserve the clock signal to the shared component as long as at least one of the processor cores has not disabled the shared component. That is, to block the clock signal to the shared component, each of the processor cores must disable the shared component. The shared component may, for example, be a shared program memory or an arbiter for an external input/output port. The clock tree may include a register and a series of clock gates. Each of the clock gates blocks the clock signal when a gate signal is de-asserted. The gate signals are generated from enablement bits in the register. The clock signal for the shared component is gated by a clock gate that blocks the clock signal only if each of the processor cores have disabled their enablement bit for the shared component.

17 Claims, 3 Drawing Sheets

UNANIMOUS VOTING FOR DISABLING OF SHARED COMPONENT CLOCKING IN A MULTICORE DSP DEVICE

This application claims priority under 35 USC §119(e)(1) of Provisional Application No. 60/248,905, filed Nov. 15, 2000.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention generally relates to digital signal processors. More particularly, the invention relates to clock control for multi-core digital signal processors. Still more particularly, the invention relates to preservation of clocks to shared components when individual subsystems become idle.

Microprocessors generally include a variety of logic circuits fabricated on a single semiconductor chip. Such logic circuits typically include a processor core, memory, and numerous other support components. Some microprocessors, such as digital signal processors (DSPs) provided by Texas Instruments, may include multiple processor subsystems each having its own processor core. Each processor subsystem includes memory and other support components for the associated processor core.

DSPs are generally sought for computationally intensive tasks because they have hardware specially designed for high performance computing. Nevertheless, it is generally desirable for microprocessors such as DSPs to be compact, consume very little power, and generate as little heat as possible. This is especially true for DSPs that reside in small, battery-powered devices such as cellular telephones, pagers, and the like. Accordingly, any improvement in DSP technology that results in smaller and lighter devices that require less power is highly desirable, particularly if improvements avoid reducing the maximum available computational performance.

BRIEF SUMMARY OF THE INVENTION

Accordingly, the present invention contemplates a digital signal processing chip employing a clock control technique that permits portions of the chip to be disabled when desired, thereby reducing power consumption. Advantageously, shared components may also be disabled, but only if each of the components that rely on a shared component agree to disable the shared component. In one embodiment, the chip includes multiple processor cores with corresponding processor subsystems, a shared component, and a clock tree. A clock tree distributes clock signals to the processor cores and the shared component. The clock tree can be configured to disable one or more of the processor cores and the shared component by blocking the corresponding clock signal. This may advantageously conserve power. However, the clock tree is configured to preserve the clock signal to the shared component as long as at least one of the processor cores has not disabled the shared component. That is, to block the clock signal to the shared component, each of the processor cores must disable the shared component. The shared component may, for example, be a shared program memory or an arbiter for an external input/output port. The clock tree may include a register and a series of clock gates. Each of the clock gates blocks the clock signal when a gate signal is de-asserted. The gate signals are generated from enablement bits in the register. The clock signal for the shared component is gated by a clock gate that blocks the clock signal only if each of the processor cores have disabled their enablement bit for the shared component.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiment of the present invention is discussed below in the context of a multi-core, fixed-point, digital signal processor (DSP) chip. This embodiment, however, is not intended to limit the scope of this disclosure to this context, rather, the preferred embodiment may have applicability to any multiple core DSP device having a shared external I/O port arbiter or other shared component.

Figure 1:
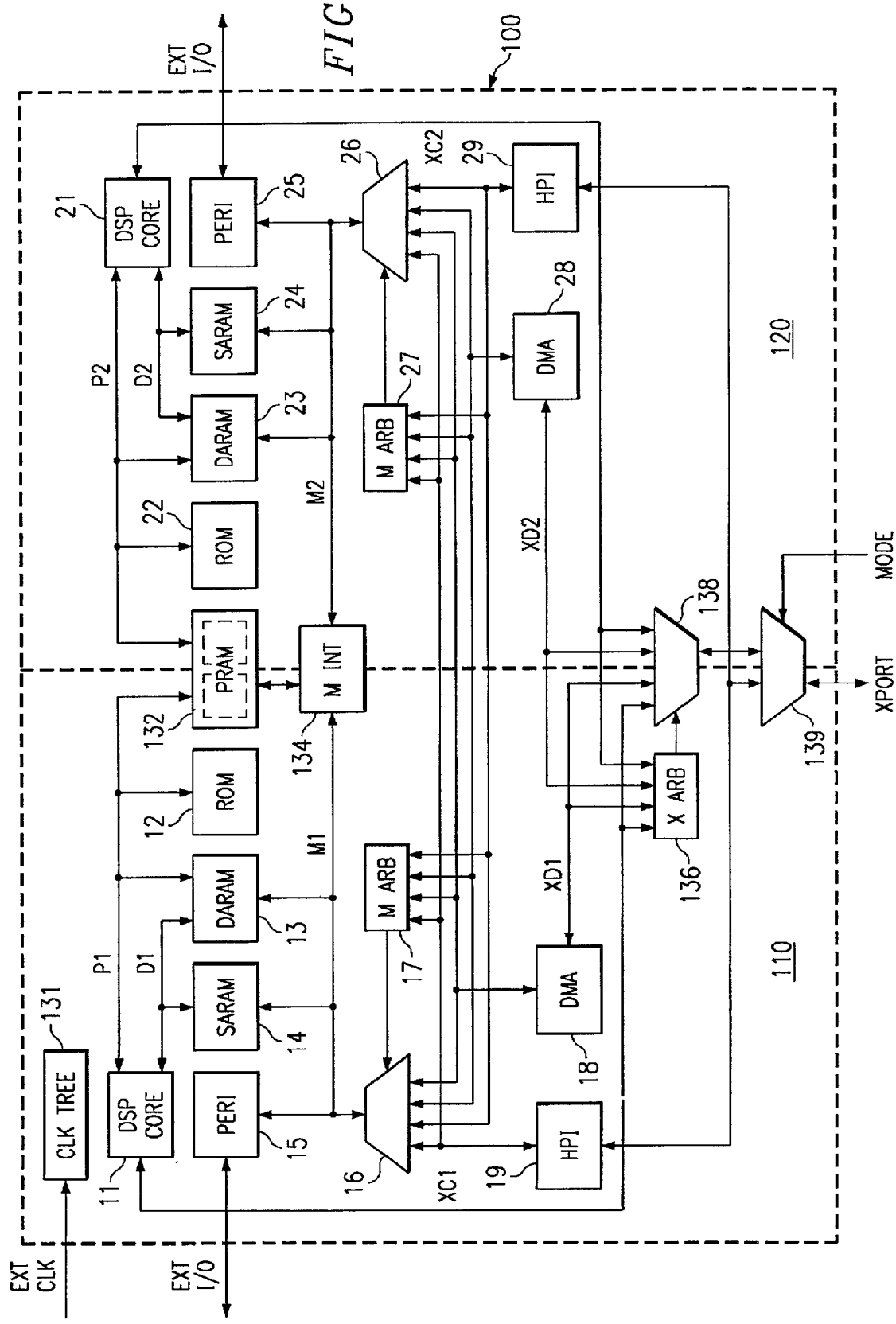
FIG. 1 shows a DSP device having an external port shared by multiple subsystem processor cores and DMA controllers.

Turning now to the figures, FIG. 1 shows a DSP chip 100 that includes multiple DSP subsystems 110, 120, a clock tree 131, a shared program memory (PRAM) 132, a memory bus interface 134, an external I/O port (XPORT) arbiter 136, an XPORT multiplexer 138, and a host port interface (HPI) multiplexer 139. Each DSP subsystem 110, 120 (generally separated by the dashed line in FIG. 1) preferably includes a DSP core 11, 21, a read-only memory (ROM) 12, 22, a dual-access, random access memory (DARAM) 13, 23, a single-access, random access memory (SARAM) 14, 24, one or more peripheral devices 15, 25, an M-bus multiplexer 16, 26, an M-bus arbiter 17, 27, a DMA controller 18, 28, a host port interface (HPI) 19, 29, and other miscellaneous support circuitry. The subsystems 110, 120, each further include an instruction bus P1, P2, a data bus D1, D2, a memory bus M1, M2, a processor core external I/O bus XC1, XC2, and a DMA controller external I/O bus XD1, XD2.

The clock tree 131 preferably receives an external clock signal and responsively generates one or more internal clock signals that are distributed throughout the chip (not specifically shown in FIG. 1). The clock tree preferably amplifies and frequency multiplies the external clock signal to generate the internal clock signals. The clock tree is preferably programmable to disable selected internal clock signals to reduce power consumption by the DSP chip.

The shared program memory (PRAM) 132 preferably is reserved for program instructions, and includes 16 blocks of dual-access RAM. Each block comprises 16 kilobytes of storage, although the block size and number of blocks can be varied as desired. Each subsystem 110, 120, preferably includes equal portions of the PRAM 132. Each DSP subsystem 110, 120 is preferably capable of executing an instruction fetch from any location in the PRAM 132 during each clock cycle. The processor cores 11, 21 concurrently fetch and execute distinct instructions from a single program stored in the PRAM 132. Although the DSP cores may execute the same software program, they do not necessarily execute the same instructions concurrently or necessarily follow the same branches in program flow.

According to the preferred embodiment, the DSP cores 11, 21 are not permitted to write to the PRAM 132. Instead, a host processor (not shown) provides the software to the PRAM 132 via the XPORT, HPI 19, 29 and memory buses M1, M2 as described further below.

The memory bus interface 134 is coupled to PRAM 132 and to the memory buses M1, M2. The memory bus interface 134 provides a set of first-in, first-out (FIFO) buffers that the memory buses M1, M2 can write to and read from. Each FIFO buffer is one way, that is, written to by one memory buffer and read by the other. This provides one method of inter-subsystem communication. The memory bus interface 134 also couples both memory buses M1, M2 to PRAM 132. The memory bus interface includes an arbiter which grants PRAM access to one of the memory buses when a PRAM access is sought. The initial programming of the PRAM and updates of the PRAM are performed via the memory buses.

The XPORT arbiter 136 and XPORT multiplexer 138 are coupled to the processor cores 11, 21, and the DMA controllers 18, 28 in each of the subsystems via respective external I/O buses XC1, XC2, XD1, XD2. The processor cores and DMA controllers arbitrate for external access as explained further below, and the arbiter 136 sets the multiplexer 138 in accordance with the arbitration results. The DSP 100 is provided in a semiconductor package that has multiple pins ("leads") to provide external connections for the chip. The package leads used by the XPORT for external access are preferably shared with the host port interface units 19, 21 Accordingly, output from the XPORT multiplexer 138 is coupled to the HPI multiplexer 139, as are the HPI units 19, 29. When the host processor asserts the MODE signal (which is the control signal for the HPI multiplexer 139) the XPORT pins are coupled to the HPI units 19, 29, and the host processor accesses the DSP device 100 as a memory-mapped device. When the host processor de-asserts the MODE signal, the XPORT leads are coupled to the XPORT multiplexer 138, and any external accesses are initiated by the cores 11, 21, or the DMA controllers 18, 28, as explained further below.

The processor cores 11, 21, preferably execute software instructions retrieved via corresponding instruction buses P1, P2, to operate on data retrieved via corresponding data buses D1, D2, to produce results provided on the data buses.

The processor cores typically include an optimized arithmetic logic unit (ALU) and a control unit. The control unit retrieves data and instructions and decodes the instructions, and the ALU operates on the data as specified by the instructions.

The ROMs 12, 22, are non-volatile memories coupled to the corresponding instruction buses P1, P2. The ROMs preferably store boot-up software for initializing the subsystems. The DARAM 13, 23 preferably includes four memory blocks, each of which support two memory accesses per clock cycle. The DARAMs 13, 23 are intended primarily for data storage, but may be used to store program instructions as well. Accordingly, they are coupled to both the corresponding instruction buses P1, P2, and to the corresponding data buses D1, D2. A register (not shown) in the DSP core 11, 21 determines whether the DARAM 13, 23 is mapped into program memory space or data memory space. The SARAMs 14, 24, preferably also include four memory blocks, each of which support one memory access per clock cycle. Each SARAM preferably is reserved for data storage, and accordingly is coupled to the corresponding data bus D1, D2.

Referring still to FIG. 1, instruction buses P1, P2, couple together the corresponding processor core 11, 21, the local DARAM 13, 23, the local ROM 12, 22, and the shared PRAM 132. Data buses D1, D2, couple together the corresponding processor core 11, 21, the local DARAM 13, 23, and the local SARAM 14, 24. Memory buses M1, M2 couple the memory bus multiplexer 16, 26, with each of the volatile memory devices 13, 14, 23, 24, 132, in the corresponding subsystem. The memory buses also couple to peripheral devices 15, 25.

Peripheral devices 15, 25 preferably each include one or more multi-channel, serial interfaces. The multi-channel serial interfaces provide high-speed, full-duplex, double-buffered serial communications. The configuration of these ports is preferably programmable by the associated processor core to allow direct interfacing with existing serial protocols. Each serial interface 15, 25 preferably supports multi-channel transmit and receive of up to 128 channels. The multi-channel serial ports perform time division multiplexing and de-multiplexing when multiple channels are enabled. Each data frame that is sent or received represents a time-division multiplexed (TDM) data stream, so that the content of one channel is interleaved with the contents of the other channels.

Memory bus multiplexers 16, 26 and memory bus arbiters 17, 27 are each coupled to all DMA controllers 18, 28, and HPI units 19, 29. Focusing for the moment on multiplexer 16, local DMA controller 18, local HPI unit 19, remote DMA controller 28, and remote HPI unit 29 can each control memory bus M1 to access peripherals 15, SARAM 14, DARAM 13, and PRAM 132. Arbitration among the local DMA controller, the local HPI unit, and the remote subsystem for access to memory bus M1 is performed by arbiter 17, which then sets the memory bus multiplexer 16 in accordance with the arbitration winner. Multiplexer 26 and arbiter 27 operate similarly for memory bus M2.

Each DMA controller 18, 28 moves data and instructions to and from local peripherals and data storage devices, and to shared PRAM 132, via the corresponding memory bus M1, M2. Each DMA controller 18, 28 can also move data to and from remote peripherals and data storage devices via the remote memory bus. Finally, each DMA controller can move data to and from external sources via an external I/O bus XD1, XD2, and the XPORT. Although the transfers may be initiated in different ways, including initiation by the processor core, the transfers are thereafter performed "in the background", i.e., without active monitoring and control by the processor core. Each DMA controller preferably provides multiple "channels" for the independent, concurrent management of multiple block transfers. DMA transfers are accomplished by first reading the data into memory internal to the DMA controller, and then writing the data from the DMA controller memory to the desired destination. When processor core memory accesses to internal memory conflict with DMA controller accesses, the DMA controller accesses are preferably given higher priority.

The HPI units 19, 29 allow an external host processor to access all internal memory via the memory buses M1, M2. To keep the overall system design simple, the host processor interfaces 19, 29 are designed to mimic a memory interface. That is, the host processor can "view" the contents of any memory location internal to the DSP device 100 and many of the processor core registers by sending an address to the HPI units 19, 29 indicating the desired location. One of the HPI units 19, 29 then retrieves the desired information and provides the information as data in the same way that a memory device would. The HPI units 19, 29 can similarly store data in the desired location. The software to be executed by the processor cores may be provided by the host processor in this manner. That is, the host processor may write the software to shared PRAM 132 via the HPI 19, 29. The HPI units 19, 29 preferably act as a slave device to the host processor, but may generate a signal to the host processor to stall the host processor during an access if the memory buses M1, M2 are busy with other tasks.

Figure 2:
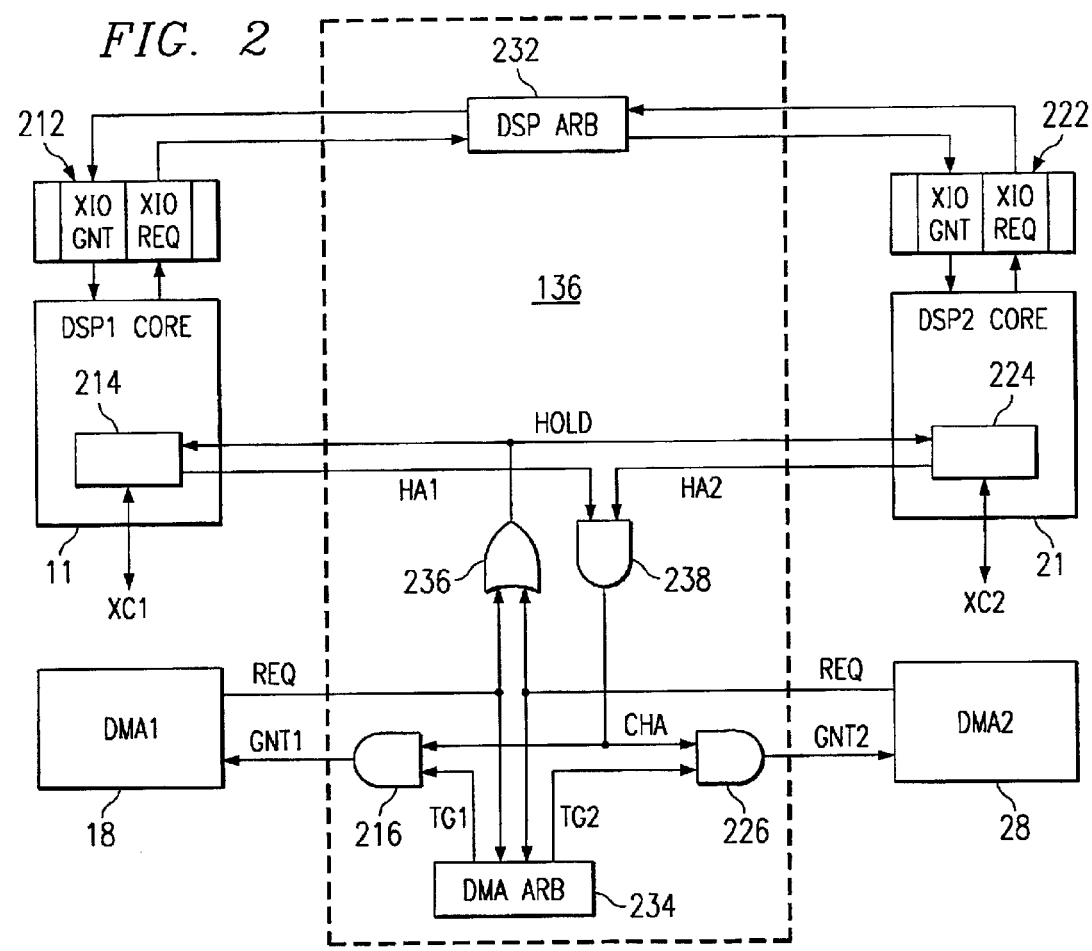
FIG. 2 shows one embodiment of an external port arbiter.

As mentioned previously, the processor cores and DMA controllers arbitrate with the XPORT arbiter 136 for access to the XPORT. As shown in FIG. 2, the XPORT arbiter includes a processor core arbiter 232, a DMA controller arbiter 234, and logic gates 216, 226, 236, and 238. Also shown in FIG. 2 are general purpose I/O (GPIO) registers 212 and 222, and external I/O bus interface logic 214 and 224. Registers 212, 222, may each include bits used for communication with and configuration of support circuitry. One of the bits in each of these registers is reserved as an external I/O request (XIO REQ) signal that can be asserted or de-asserted by the processor core. The XIO REQ signals are coupled to the processor core arbiter 232. Another of the bits in each of the registers is reserved as an external I/O grant (XIO GNT) signal that can be asserted or de-asserted by the arbiter 232.

The processor cores 11, 21 preferably assert the XIO REQ signal when they desire control of the XPORT. The cores then poll the XIO GNT signal until it is asserted, at which time they may begin using the XPORT, subject to the assertion of a HOLD signal as described below. Once the processor cores are through using the XPORT, they preferably de-assert the XIO REQ signal. Consequently, when there is no conflict, the arbiter 232 asserts the appropriate XIO GNT signal in response to the assertion of an XIO REQ signal. If both XIO REQ signals are asserted in the same clock cycle, the XIO GNT signal is asserted in register 212. In any event, the assertion of XIO GNT signal is maintained until the corresponding XIO REQ signal is de-asserted. The assertion and de-assertion of the XIO REQ signals is performed by software executing on the processor core, so the processor core arbitration scheme is primarily controlled by software.

The external I/O bus interface logic 214, 224 of the processor cores receives a HOLD signal from the XPORT arbiter 136. If the interface logic is active, i.e., external I/O transactions are being performed, the interface logic ignores the HOLD signal. The processor core can continue operating via the XPORT as long as the host processor does not interfere (see FIG. 1). Once there is a pause in the external I/O activity, or if there is no current external I/O activity, the interface logic replies to an assertion of the HOLD signal by asserting a hold acknowledge (HA1, HA2) signal. Thereafter, as long as the HOLD signal is asserted, the interface logic is suspended and any processor core attempts to access the XPORT are stalled. The interface logic preferably generates the HA signal using hard-wired logic.

The DMA controllers 18, 28 preferably assert request (REQ) signals to the arbiter 136 when they desire access to the XPORT. The HOLD signal is generated from the REQ signals by logic gate 236. Logic gate 236 preferably comprises a logical OR gate. The HOLD signal is asserted if either or both of the request signals are asserted. The DMA arbiter 234 also receives both request signals, and in response it asserts a tentative grant signal TG1, TG2 for one of the DMA controllers. The tentative grant signals TG1, TG2, for controllers 18, 28 are gated through logic gates 216, 226, respectively. Gates 216, 226 preferably comprise logical AND gates. Logic gates 216, 226 respectively generate grant signals GNT1, GNT2 for controllers 18, 28 from the tentative grant signals TG1, TG2, and from a combined acknowledgement signal CHA. Logic gates 216, 226, assert their respective grant signals GNT1, GNT2 when both the tentative grant signal (TG1, TG2) and the combined acknowledgement signal CHA are asserted. The combined acknowledgement signal CHA is generated by logic gate 238, which asserts the combined acknowledge signal CHA only when hold acknowledgement signals HA1, HA2 from both processor cores are asserted. Logic gate 238 preferably comprises a logical AND gate.

Consequently, XPORT arbiter 136 asserts a grant signal to the requesting DMA controller 18, 28 only if both processor cores acknowledge that they are currently not using the XPORT. If both DMA controllers simultaneously request access, the DMA arbiter 234 resolves the conflict on a rotating priority basis, asserting a GNT signal only to the controller currently having priority.

The DMA controllers 18, 28 are designed to pause between XPORT accesses, preferably for at least one clock cycle. This allows the controllers to interleave their XPORT accesses if both are actively performing external I/O. If only one DMA controller is active, the pause also allows either of the processor cores to seize control of the XPORT.

Figure 3:
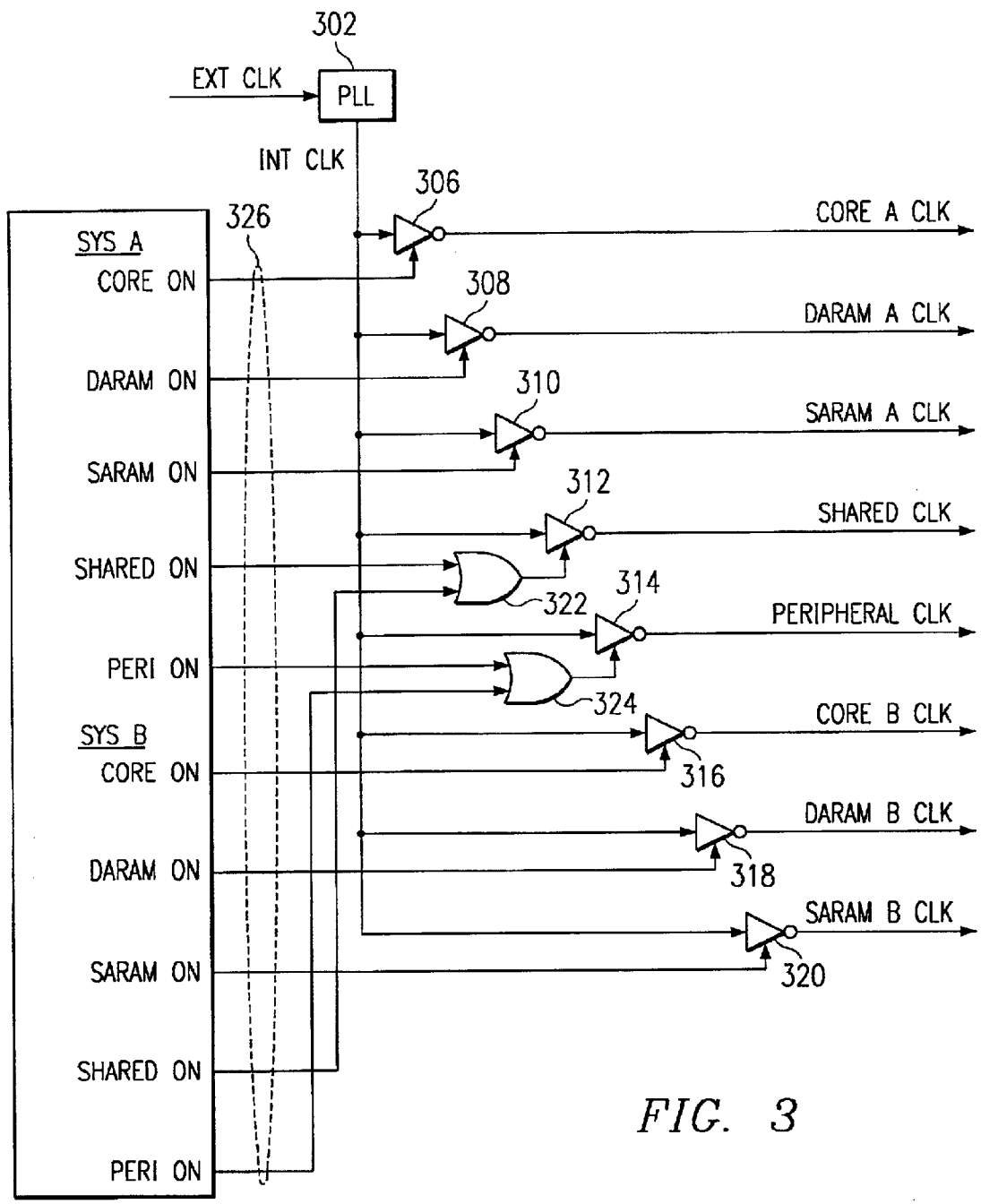
FIG. 3 shows one embodiment of a clock tree having shared component clock protection.

FIG. 3 shows a preferred embodiment of a clock tree 131. As shown, the clock tree 131 preferably includes a phase-lock loop (PLL) 302, a configuration register 304, a series of gates 306–320, and several other logic gates 322, 324. The PLL 302 frequency-multiplies the external clock signal to generate an internal clock signal. The internal clock signal couples to each of the gates 306–320. Each of the gates 306–320 in turn provides a clock signal to one or more devices internal to DSP 100. In the preferred embodiment, the gates are inverting buffers that can be disabled by a gate signal provided by configuration register 304. While a gate signal is asserted, the corresponding internal clock signal is inverted and amplified to drive the clock signal to the desired destination. When a gate signal is de-asserted, the corresponding buffer is disabled and the output signal from the buffer is held constant. By enabling and disabling individual buffers 306–320, various portions of DSP chip 100 can be shut down.

The gate signals 326 are generated from bits of the configuration register 304. Gate 306 drives the clock for processor core 11, and register 304 includes an enablement bit (SYS A CORE ON) that provides the gate signal for gate 306. Similarly, gates 308, 310, 316, 318, 320 drive the clock signals for DARAM 13, SARAM 14, processor core 21, DARAM 23, and SARAM 24, respectively, and register 304 includes corresponding enablement bits (SYS A DARAM ON, SYS A SARAM ON, SYS B CORE ON, SYS B DARAM ON, SYS B SARAM ON) that provide the corresponding gate signals.

Gate 312 drives the clock signal for shared PRAM 132, and gate 314 drives the clock signal for the support components such as peripherals 15, 25, memory bus multiplexers 16, 26, memory bus arbiters 17, 27, DMA controllers 18, 28, HPI units 19, 29, XPORT arbiter 136, XPORT multiplexer 138, HPI multiplexer 139, and external I/O bus interface logic 214, 224. Logic gate 322, which is preferably a logical OR gate, is provided to ensure that gate 312 is disabled only if both subsystems have disabled the shared PRAM 132. Otherwise, the clock signal SHARED CLK continues to be driven so that the active subsystem can still access the shared PRAM.

Similarly support components such as the XPORT arbiter 136 and external I/O interface logic 214, 224 continue to be driven by clock signal PERIPHERAL CLK unless both systems have been disabled. This ensures, for example, that even if one system has been disabled, the other system can still arbitrate for and gain access to the XPORT.

Clock tree 131 thereby permits selective portions of the DSP device to be disabled by halting their clock signals, while simultaneously preventing the accidental disablement of shared components that may be accessed by subsystems that remain active. Disablement of a shared component requires that both systems reset the corresponding enablement bit in the configuration register. This allows for a customizable tradeoff between power consumption and available computational performance.

In the discussed embodiment, the DSP device 100 includes only two DSP subsystems 110, 120. As one skilled in the art will appreciate, there may be more than two DSP subsystems. Referring to FIG. 3, the clock tree may be expanded, and the gate signals for clocks to the shared components may be generated by logic gates that combine enablement bits from each of the subsystems.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A digital signal processing system, comprising:
at least one shared component, wherein the shared component includes an external input/output (XPORT) arbiter;
a plurality of processor subsystems that share said shared component, wherein each of the plurality of processor subsystems includes a processor core having a XPORT interface coupled to a XPORT; and
a clock tree configured to provide a clock signal to said shared component, wherein the clock signal to said shared component is disabled only if each of the plurality of processor subsystems disables the shared component, wherein the clock tree supplies a corresponding processor clock signal to each of the processor cores, said clock tree configured to separately and independently disable the processor cores by suspension of the corresponding processor clock signal from the clock tree, wherein the processor clock signals are distinct from the signal to the shared component, and wherein the XPORT interfaces each receive the clock signal to the shared component.

2. The system of claim 1, wherein the plurality of processor subsystems, the shared component, and the clock tree are fabricated on a single chip.

3. The system of claim 1, wherein the shared component comprises a shared program memory.

4. The system of claim 1, wherein the XPORT arbiter is coupled to each of the XPORT interfaces and is configured to assert a hold signal to the XPORT interfaces when another component requests access to the XPORT, wherein the XPORT arbiter requires an assertion of a hold acknowledge signal from each of the XPORT interfaces before granting the requested XPORT access.

5. The system of claim 1, wherein the clock tree includes a register having a plurality of enablement bits, each of said enablement bits configured to enable a corresponding one of a plurality of clock signals when asserted, wherein said plurality of clock signals are coupled to a corresponding plurality of processor subsystems.

6. The system of claim 5, wherein the clock tree further includes a clock gate for each of the plurality of clock signals, wherein said each clock gate receives at least one of said plurality of enablement bits from said register.

7. The system of claim 6, wherein the clock tree further includes a logic gate coupled to each of the shared component enablement bits and to one of said clock gates, wherein the logic gate is configured to assert a gate signal to said one of said clock gates for the shared component clock if at least one shared component enablement bit is asserted.

8. The system of claim 7, wherein said clock gates each comprises gated inverting buffers, and said logic gates comprise logical OR gates.

9. The system of claim 7, wherein said logic gates de-assert the gate signal to the corresponding clock gate if none of the shared component enablement bits are asserted.

10. A method of providing a clock signal to a shared component shared by a plurality of subsystems, wherein the method comprises:
generating a clock signal; and
passing the clock signal to the shared component only if at least one of the subsystems has not de-asserted a shared component enablement bit, wherein the shared component includes an external input/output port (XPORT) arbiter, wherein each of the plurality of subsystems includes a processor core having a XPORT interface coupled to a XPORT;
supplying a processor clock signal to each of the processor cores, wherein each of the processor cores is separately and independently disabled by suspension of the corresponding processor clock signal, wherein the processor clock signals are distinct from the clock signal to the shared component, and wherein the XPORT interfaces each receive the clock signal to the shared component.

11. The method of claim 10, further comprising:
blocking the clock signal to the shared component only if each of the plurality of subsystems has de-asserted a corresponding shared component enablement bit.

12. The method of claim 10, wherein the plurality of subsystems and the shared component are fabricated on a single chip.

13. The method of claim 10, wherein the shared component comprises a shared program memory.

14. A digital signal processing chip that comprises:

an external input/output port (XPORT);

an XPORT arbiter;

a plurality of processor cores configured to access the XPORT, wherein each of the plurality of processor cores includes an XPORT interface coupled to the XPORT arbiter; and a clock tree configured to provide a clock signal to the XPORT arbiter and the XPORT interfaces, wherein the clock tree is configured to disable the clock signal if each of the plurality of processor cores de-asserts a respective peripheral enablement bit, wherein the clock tree supplies a corresponding processor clock signal to each of the processor cores, said clock tree configured to separately and independently disable the processor cores by suspension of the corresponding processor clock signal from the clock tree, wherein the processor clock signals are distinct from the clock signal to the XPORT arbiter, and wherein the XPORT interfaces each receive the clock signal to the XPORT arbiter.

15. The chip of claim 14, wherein the clock tree includes a register having said respective enablement bits, wherein the clock tree further includes a logic gate coupled to each of the respective enablement bits and configured to assert a gate signal only if at least one shared component enablement bit is asserted.

16. The chip of claim 15, wherein the clock tree further includes a clock gate coupled to the logic gate to receive the gate signal, wherein the logic gate is configured to block the clock signal only if the gate signal is de-asserted.

17. The chip of claim 14, wherein the processor clock signals to each of the processor cores are configured to be independently blocked and passed.

* * * * *